United States Patent
Miklós

(10) Patent No.: US 10,476,804 B2
(45) Date of Patent: Nov. 12, 2019

(54) CONGESTION LEVEL CONFIGURATION FOR RADIO ACCESS NETWORK CONGESTION HANDLING

(71) Applicant: Telefonaktiebolaget LM Ericsson (publ), Stockholm (SE)

(72) Inventor: György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 15/125,279

(22) PCT Filed: Mar. 17, 2014

(86) PCT No.: PCT/EP2014/055320
§ 371 (c)(1),
(2) Date: Sep. 12, 2016

(87) PCT Pub. No.: WO2015/139726
PCT Pub. Date: Sep. 24, 2015

(65) Prior Publication Data
US 2017/0078209 A1  Mar. 16, 2017

(51) Int. Cl.
*H04L 12/833* (2013.01)
*H04W 28/02* (2009.01)
(Continued)

(52) U.S. Cl.
CPC .......... *H04L 47/2458* (2013.01); *H04L 47/11* (2013.01); *H04L 47/122* (2013.01);
(Continued)

(58) Field of Classification Search
None
See application file for complete search history.

(56) References Cited

U.S. PATENT DOCUMENTS 7,336,611 B1 * 2/2008 Aweya .................... H04L 47/10
370/235
10,015,225 B2 * 7/2018 Gouache .......... H04N 21/23439
(Continued)

OTHER PUBLICATIONS

3rd Generation Partnership Project, "3rd Generation Partnership Project; Technical Specification Group Services and System Aspects; Study on system enhancements for user plane congestion management (Release 12)", Technical Report, 3GPP TR 23.705 V0.9.0, Nov. 1, 2013, pp. 1-58, 3GPP, France.
(Continued)

*Primary Examiner* — Hicham B Foud
(74) *Attorney, Agent, or Firm* — Sage Patent Group

(57) ABSTRACT

Congestion level configuration for radio access network congestion handling A radio access network node (100) of a cellular network receives an indication of one or more criteria. The criteria which define one or more congestion levels. Further, the radio access network node (100) receives, for each of the one or more congestion levels, an indication of a congestion handling policy associated with this congestion level. Depending on the one or more criteria, the radio access network node (100) determines whether one of the one or more congestion levels is reached. In response to determining that one of the one or more congestion levels is reached, the radio access network node (100) applies the congestion handling policy associated with this congestion level.

19 Claims, 10 Drawing Sheets

(51) Int. Cl.
  *H04L 12/803* (2013.01)
  *H04L 12/801* (2013.01)
  *H04L 12/851* (2013.01)

(52) U.S. Cl.
  CPC .......... *H04L 47/2441* (2013.01); *H04L 47/29* (2013.01); *H04W 28/0236* (2013.01); *H04W 28/0247* (2013.01); *H04W 28/0284* (2013.01); *H04W 28/0289* (2013.01); *H04L 47/12* (2013.01)

(56) References Cited

U.S. PATENT DOCUMENTS

| | | | |
|---|---|---|---|
| 2008/0159128 A1* | 7/2008 | Shaffer | H04L 47/10 370/229 |
| 2008/0159149 A1* | 7/2008 | Okuno | H04L 47/11 370/237 |
| 2013/0021933 A1 | 1/2013 | Kovvali et al. | |
| 2013/0107701 A1* | 5/2013 | Sarkar | H04L 41/0836 370/229 |
| 2014/0022904 A1 | 1/2014 | Ahmad et al. | |
| 2014/0029420 A1* | 1/2014 | Jeong | H04L 12/5692 370/229 |
| 2015/0071074 A1* | 3/2015 | Zaidi | H04L 45/308 370/235.1 |

OTHER PUBLICATIONS

Ericsson, "RAN congestion mitigation function", SA WG2 Temporary Document, SA WG2 Temporary Document, Mar. 24, 2014, pp. 1-3, S2-14xxxx, 3GPP.

Ericsson, "General issues with CN-based solutions", SA WG2 Temporary Document, SA WG2 Meeting #100, Nov. 11, 2013, pp. 1-4, S2-134010, 3GPP.

Ericsson, "Performance of RAN-based and CN-based UPCON Solutions", SA WG2 Temporary Document, SA WG2 Meeting #100, Nov. 11, 2013, pp. 1-18, S2-134012, 3GPP.

Ericsson, "Evaluation of RAN-based solutions", SA WG2 Temporary Document, SA WG2 Meeting #100, Nov. 11, 2013, pp. 1-12, S2-134008, 3GPP.

* cited by examiner

CONGESTION LEVEL CONFIGURATION FOR RADIO ACCESS NETWORK CONGESTION HANDLING

TECHNICAL FIELD

The present invention relates to methods for handling congestions in a radio access network and to corresponding devices.

BACKGROUND

In cellular networks, e.g., as specified by 3GPP ($3^{rd}$ Generation Partnership Project), congestions may occur on a radio interface which is used to convey data to and from a user equipment (UE). The risk of such congestions can be expected to increase with the ongoing growth of traffic volumes in cellular networks.

In 3GPP TS 23.401 V12.4.0 (2014-03), section 4.7.2, a bearer mechanism is described which may be used for ensuring a certain Quality of Service (QoS) treatment of Internet Protocol (IP) based user traffic. Traffic that requires differentiated QoS treatment is classified into bearers. For each bearer, a parameter referred to as QCI (QoS Class Identifier) determines the basic QoS treatment. Other parameters, such as the MBR (Maximum Bitrate), GBR (Guaranteed bitrate), UE or APN (Access Point Name) specific AMBR (Aggregate Maximum Bitrate), and ARP (Allocation and Retention Priority) parameters can further influence the quality of service applied to the traffic on a given bearer.

However, these QoS parameters do not support a predictable congestion management by the operator of the cellular network. For example, the GBR and MBR parameters only apply to GBR bearers while most of the traffic currently goes over non-GBR bearers. The AMBR parameter only allows to enforce a maximum over several bearers which is not flexible enough to specify congestion behavior.

Further, there can be many vendor-specific parameters which are based on the QCI and are set in the RAN. If RAN equipment from multiple vendors is used by the same operator, which is a common scenario, the overall result with respect to user experience may become unpredictable. Further, also such vendor-specific parameters may not be sufficient for managing the handling of congestions.

In 3GPP TR 23.705 V0.9.0 (2013-11), a number of solutions are suggested to address congestions. In some of these solutions congestion mitigation is implemented in a Radio Access Network (RAN) of the cellular network, while in other solutions congestion mitigation is implemented in a Core Network (CN) of the cellular network. In the following, the former class of solutions will be referred to as RAN-based solutions while the latter class of solutions will be referred to as CN-based solutions.

The CN-based solutions may suffer from a number of performance issues. These performance issues may for example result from the fact that a delayed feedback control is used, since the RAN reports congestions on a mid to long timescale, e.g., after several seconds or minutes. As a result, the CN only has delayed and limited information about the RAN congestion status. Furthermore, the delayed feedback may also result in oscillating system performance, which may in turn cause system instability. Further, as for example explained in 3GPP tdoc S2-134010 (SA WG2 Meeting #100, 11-15 Nov. 2013, San Francisco, USA), the CN-based solutions may be difficult to harmonize with existing RAN mechanisms.

Among the RAN-based solutions, some solutions are based on a packet marking indicated from the CN to the RAN.

For example, a solution referred to as "Solution 2.1: Flow priority-based traffic differentiation on the same QCI (FPI)" uses an FPI marking (FPI: Flow Priority Indicator) marking of data packets to determine the priority of a flow in the RAN. If the delay budget of a flow cannot be fulfilled, flows having the same QCI based priority are prioritized based on FPI priority. Besides the priority handling, there may also be an implementation specific starvation protection mechanism.

However, this solution may be problematic with respect to delay budget. For example, in the case of internet traffic typically a QCI of 9 or 8 is used, which means that delay budget is as high as 300 ms. Further, in typical implementations, Active Queue Management (AQM) techniques may be used in which data packets are actively dropped to avoid filling up the full buffer and keep the delay low. As a result, the delay may never reach the delay budget and FPI based prioritization becomes irrelevant. Further, if implementation specific conditions are used to avoid starvation, the solution may become difficult to manage by the operator.

Further, a solution referred to as "Solution 2.2: Flow and bearer QoS differentiation by RAN congestion handling description (FQI)" uses an FQI marking (FQI: Flow QoS Index) of data packets to refer to a specific RAN configuration which determines congestion handling. This RAN configuration is defined by a RAN Congestion Handling Descriptor (RCHD) which is defined per QCI, per FQI, and per congestion level.

In this solution the operator may for example define bitrate targets per congestion level and thereby influence the resource sharing in the RAN. While this may be used by the operator for congestion handling, it also introduces certain restrictions when it comes to how the congestion management is performed. One such restriction is that the congestion levels are defined in a specific manner. However, some operators may prefer one definition of the congestion levels, while other operators may prefer another definition of the congestion levels. Further, this solution defines a certain way of radio resource sharing which introduces a limitation to the RAN implementation.

Further, a solution referred to as "Solution 2.4: Differentiation of IP flows based on flow level QCI" uses packet marking to override the bearer QCI, and lets the flow QCI determine the RAN handling characteristics.

Further, a solution referred to as "Solution 2.3: Enhancing existing bearer concepts" is also a RAN-based solution, which however does not rely on packet marking. Rather, it relies on the current bearer based differentiation.

This solution may be problematic with respect to RAN implementation. For example, a RAN node would typically use different mechanisms to ensure QoS on a per bearer or per flow level. For example, the Packet Data Control Protocol (PDCP) and Radio Link Control (RLC) handling may be performed according to mechanisms on a per flow level, and this PDCP and RLC handling may be performed before scheduling on a per bearer level. For this reason, it may be hard to achieve the same QCI treatment on both the per bearer level and the per flow level. Further, problems may arise in terms of backwards compatibility with the existing QCI mechanism, because the bearer QCI is overridden.

Accordingly, there is a need for techniques which allow for efficiently managing the handling of congestions in a cellular network.

SUMMARY

According to an embodiment of the invention, a method of congestion handling in a cellular network is provided. According to the method, a RAN node of the cellular network receives an indication of one or more criteria. The one or more criteria define one or more congestion levels. Further, the RAN node receives, for each of the one or more congestion levels, an indication of a congestion handling policy associated with this congestion level. Depending on the one or more criteria, the RAN node determines whether one of the one or more congestion levels is reached. In response to determining that one of the one or more congestion levels is reached, the RAN node applies the congestion handling policy associated with this congestion level.

According to a further embodiment of the invention, method of managing congestion handling in cellular network is provided. According to the method, a network node of the cellular network determines one or more criteria defining one or more congestion levels to be detected by at least one RAN node of the cellular network. Further, the network node sends an indication of the one or more criteria to the at least one RAN node.

According to a further embodiment of the invention, a RAN node for a cellular network is provided. The RAN node comprises at least one interface. Further, the RAN node comprises at least one processor. The at least one processor is configured to receive an indication of one or more criteria defining one or more congestion levels and, for each of said one or more congestion levels, an indication of a congestion handling policy associated with this congestion level. Further, the at least one processor is configured to determine, depending on said one or more criteria, whether one of said one or more congestion levels is reached and, in response to determining that one of said one or more congestion levels is reached, apply the congestion handling policy associated with this congestion level.

According to a further embodiment of the invention, a network node for a cellular network is provided. The network node comprises at least one interface. Further, the network node comprises at least one processor. The at least one processor is configured to determine one or more criteria defining one or more congestion levels to be detected by at least one RAN node of the cellular network. Further, the at least one processor is configured to send an indication of the one or more criteria to the at least one RAN node.

According to a further embodiment of the invention, a computer program or computer program product is provided, e.g., in the form of a non-transitory storage medium, which comprises program code to be executed by at least one processor of a RAN node of a cellular network. Execution of the program code causes the at least one processor to receive an indication of one or more criteria defining one or more congestion levels and, for each of said one or more congestion levels, an indication of a congestion handling policy associated with this congestion level. Further, execution of the program code causes the at least one processor to determine, depending on said one or more criteria, whether one of said one or more congestion levels is reached and, in response to determining that one of said one or more congestion levels is reached, apply the congestion handling policy associated with this congestion level.

According to a further embodiment of the invention, a computer program or computer program product is provided, e.g., in the form of a non-transitory storage medium, which comprises program code to be executed by at least one processor of a network node of a cellular network. Execution of the program code causes the at least one processor to determine one or more criteria defining one or more congestion levels to be detected by at least one RAN node of the cellular network. Further, execution of the program code causes the at least one processor to send an indication of the one or more criteria to the at least one RAN node.

Details of such embodiments and further embodiments will be apparent from the following detailed description of embodiments.

DETAILED DESCRIPTION OF EMBODIMENTS

Figure 1:
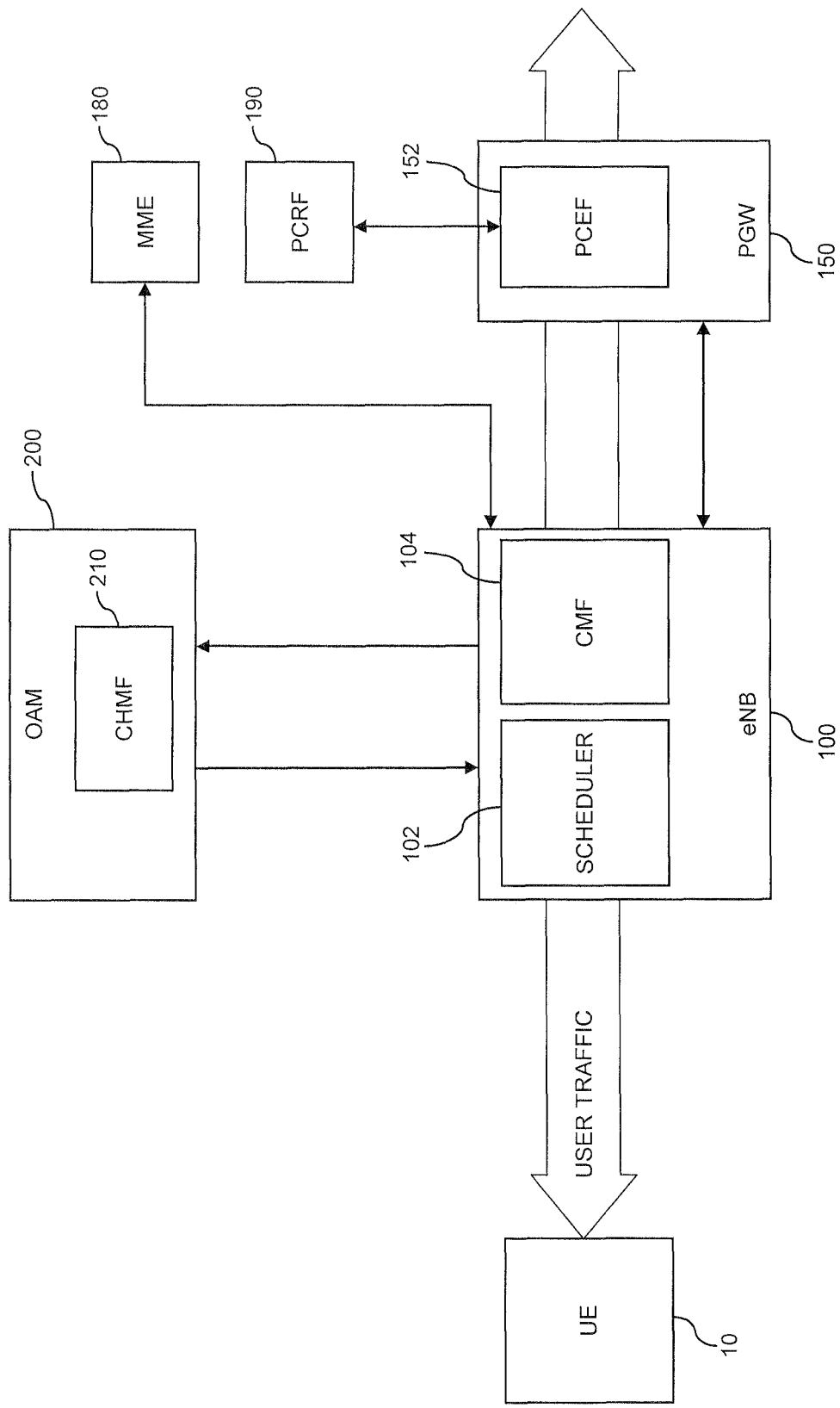
FIG. 1 schematically illustrates an exemplary architecture for implementing management of congestion handling according to an embodiment of the invention.

In the following, concepts according to embodiments of the invention will be explained in more detail by referring to the accompanying drawings. The illustrated concepts relate to RAN-based congestion handling in a cellular network. In the illustrated embodiments, it is assumed that the cellular network is based on the LTE (Long Term Evolution) technology or on the UMTS technology as specified by 3GPP. However, it is to be understood that the illustrated concepts could be applied in a corresponding manner to other cellular network technologies, e.g., GSM (Global System for Mobile Communications) in connection with GPRS (General Packet Radio Service) or CDMA2000.

In the concepts as illustrated in the following, a RAN node, such as an evolved Node B (eNB) of the LTE technology or a Node B (NB) or Radio Network Controller (RNC) of the UMTS technology, receives an indication of one or more criteria defining one or more congestion levels. For each of such congestion levels, the RAN node also receives an indication of a congestion handling policy associated with this congestion level. Depending on the indicated criteria, the RAN node determines whether one of the indicated congestion levels is reached. If this is the case, the RAN node applies the congestion handling policy associated with this congestion level.

Accordingly, the RAN node determines its own congestion level based on criteria which can be flexibly configured, thereby allowing utilization of various kinds of congestion level definitions. A number of different criteria are possible, considering operator requirements or vendor implementations. For each congestion level, the RAN can be configured with a Base Bitrate (BBR) and an Excess Traffic Priority (ETP) on a per flow basis. Traffic below the BBR is referred to as base traffic; traffic above the BBR is referred to as excess traffic. The RAN node may down-prioritize excess traffic compared to base traffic, i.e., which means that base traffic is served before excess traffic. A relative priority mechanism using the ETP may be used to prioritize excess traffic flows compared to each other.

The illustrated concepts can be used by the operator of the cellular network to throttle certain types of traffic if a given congestion level is reached. This can be achieved in a way that maximizes the utilization of radio resources. For example, when using a congestion handling policy with the above-mentioned BBR, excess traffic is not dropped but just down-prioritized so that it can be transmitted on any remaining radio resources. The congestion level detection can take into account short-term changes in the RAN. Further, harmonization with existing RAN mechanisms, such as existing mechanisms for AQM, scheduling, cell selection, link adaptation, interference cancellation, or the like, is feasible by providing sufficient flexibility to allow usage of a compatible congestion level definition.

Further details of the concepts and exemplary implementations will now be explained with reference to the accompanying drawings.

FIG. 1 shows a block diagram for schematically illustrating an LTE based architecture for implementation of the concepts as outlined above. As illustrated, the architecture provides an eNB 100, a Packet Data Network Gateway (PGW) 150, and an Operations an Maintenance (OAM) node 200. Further, a Mobility Management Entity (MME) 180, and a Policy and Charging Rules Function (PCRF) 190 are provided. The MME 180 may be responsible for managing mobility of UEs in the cellular network, e.g., as specified in 3GPP TS 23.401 V12.4.0. The PCRF may be responsible for policing and charging related functionalities, e.g., as specified in 3GPP TS 23.203 V12.4.0 (2014-03). As illustrated, the eNB 100 and the PGW 150 carry user plane traffic of a UE 10. Between the eNB 100 and the UE 10, the user plane traffic is carried over the LTE radio interface. The eNB 100 is part of the RAN of the cellular network, i.e., is a RAN node. The PGW 150, the MME 180, and the PCRF 190 are part of a CN of the cellular network, i.e., are CN nodes.

It should be understood that the UE 10 is merely illustrated as an example of multiple UEs which may be served by the eNB 100 and the PGW 150. Further, in a typical network hierarchy, the PGW 150 may serve multiple eNBs, of which the eNB 100 is only one example. Moreover, it should be understood that the architecture may provide further nodes, which are not illustrated in FIG. 1, e.g., intermediate transport nodes in the RAN or CN, or further gateways, such as a Serving Gateway (SGW).

In the illustrated implementation, functionalities of the eNB 100 include a scheduler 102 and a congestion mitigation function (CMF) 104. The scheduler 102 is responsible of assigning radio resources of the radio interface to the UE 10 or other UEs. The CMF 104 is responsible for detecting and mitigating congestions. Although FIG. 1 shows the scheduler 102 and the CMF 104 as separate blocks, it should be understood that the CMF 104 may be implemented as part of the scheduler 102 or that the scheduler 102 and the CMF 104 may otherwise share functionalities. Details concerning the operation and possible implementations of the CMF 104 will be further explained below. Functionalities of the PGW 150 include a Policy and Charging Enforcement Function (PCEF) 152. In the concepts as illustrated herein, the PCEF 152 may perform flow classification or marking of data packets. These functionalities and other functionalities of the PCEF 152 may correspond to those as for example specified in 3GPP TS 23.203 V12.4.0. Functionalities of the OAM node 200 include a congestion handling management function (CHMF) 210. The CHMF 210 is responsible for determining the criteria defining the congestion level(s) and may also be responsible for determining the congestion handling policy associated with such congestion level(s). These determinations by the CHMF 210 may be based on manual inputs by the operator. In addition or as an alternative, these determinations may also be based on automatic control processes in the CHMF 210. For example, the eNB 100 and/or other eNBs may provide congestion information to the OAM node 200, e.g., information on number of experienced congestions in a given time interval, duration of such congestions, or the like, and the CHMF 210 may base the determination of the criteria and/or congestion handling policy on such congestion information. For example, if the congestion information indicates frequently occurring congestions, criteria for defining a certain congestion level could be modified to allow earlier detection and addressing of such congestions by the corresponding congestion handling policy. The OAM node 200 then indicates the determined criteria and/or congestion handling policy to the eNB 100, in particular to the CMF 104. In some implementations, also other nodes could be involved in making such determinations and sending corresponding indications. For example, the MME 180, PCRF 190, or the PGW 150 could determine the congestion handling policy for a certain congestion level and indicate it to the eNB 100. In the PGW 150, this could for example be implemented as an additional functionality of the PCEF 152.

Figure 2:
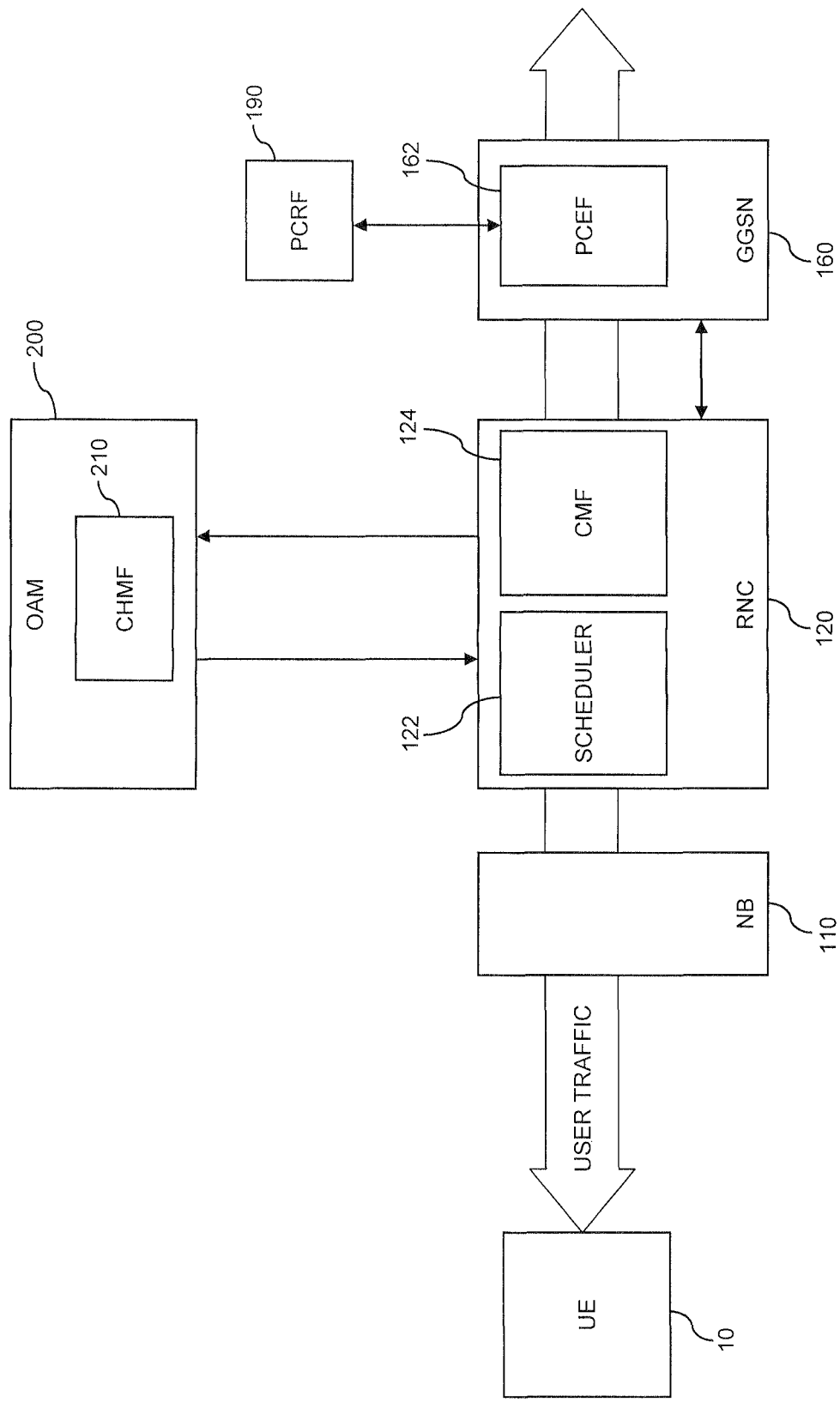
FIG. 2 schematically illustrates a further exemplary architecture for implementing management of congestion handling according to an embodiment of the invention.

FIG. 2 shows a block diagram for schematically illustrating a UMTS based architecture which may alternatively or additionally be used for implementation of the concepts as outlined above. In this case, the architecture provides a Node B (NB) 110, an RNC 120, and a Gateway GPRS Support Node (GGSN) 160. Further, also the PCRF 190 and the OAM node 200 are provided. As illustrated, the NB 110, the RNC 120, and the GGSN 160 carry user plane traffic of the UE 10. Between the NB 110 and the UE 10, the user plane traffic is carried over the UMTS radio interface. The NB 110 and the RNC are part of a RAN of the cellular network, i.e., are RAN nodes. The GGSN 160 is part of a CN of the cellular network, i.e., is a CN node.

Also in this case, it should be understood that the UE 10 is merely illustrated as an example of multiple UEs which may be served by the NB 110, the RNC 120, and the GGSN 160. Further, in a typical network hierarchy, the GGSN 160 may serve multiple RNCs, of which the RNC 120 is only one example. Still further, the RNC 120 may serve multiple NBs, of which the NB 110 is only one example. Moreover, it should be understood that the architecture may provide further nodes, which are not illustrated in FIG. 2, e.g., intermediate transport nodes in the RAN or CN, or further gateways, such as a Serving GPRS Support Node (SGSN).

In the illustrated implementation, functionalities of the RNC 120 include a scheduler 122 and a CMF 124. The scheduler 122 is responsible of assigning radio resources of the radio interface to the UE 10 or other UEs. The CMF 124 is responsible for detecting and mitigating congestions, similar to the above-mentioned CMF 104. Details concerning the operation and possible implementations of the CMF 124 will be further explained below. Functionalities of the GGSN 160 include a PCEF 162. Similar to the PCEF 152, the PCEF 162 may perform flow classification or marking of data packets, and its functionalities may correspond to those as for example specified in 3GPP TS 23.203 V12.4.0. Also in the architecture of FIG. 2, the OAM node 200 includes the CHMF 210, which is responsible for determining the criteria defining the congestion level(s) and may also be responsible for determining the congestion handling policy associated with such congestion level(s). However, in this case the OAM node 200 indicates the determined criteria and/or congestion handling policy to the RNC 120, in particular to the CMF 124. In some implementations, also other nodes could be involved in the determination of criteria defining congestion levels and/or congestion handling policies and in the sending of corresponding indications to the RNC 120. For example, the PCRF 190, or the GGSN 160 could determine the congestion handling policy for a certain congestion level and indicate it to the RNC 120. In the GGSN 160, this could for example be implemented as an additional functionality of the PCEF 162.

It should be understood that the distribution of functionalities as illustrated in FIGS. 1 and 2 is merely exemplary and that other implementations are possible as well. For example, in the implementation of FIG. 2, the scheduler 122 could be located in the NB 110, e.g., in implementations using the UMTS technology in connection with High Speed Packet Access (HSPA). Further, also at least a part of the CMF 124 could be located in the NB 110. Still further, functionalities of the CMF 124 could be distributed between the NB 110 and the RNC. Still further, a PGW could also be provided in the implementation of FIG. 2, as an alternative or in addition to the GGSN 160.

Figure 3:
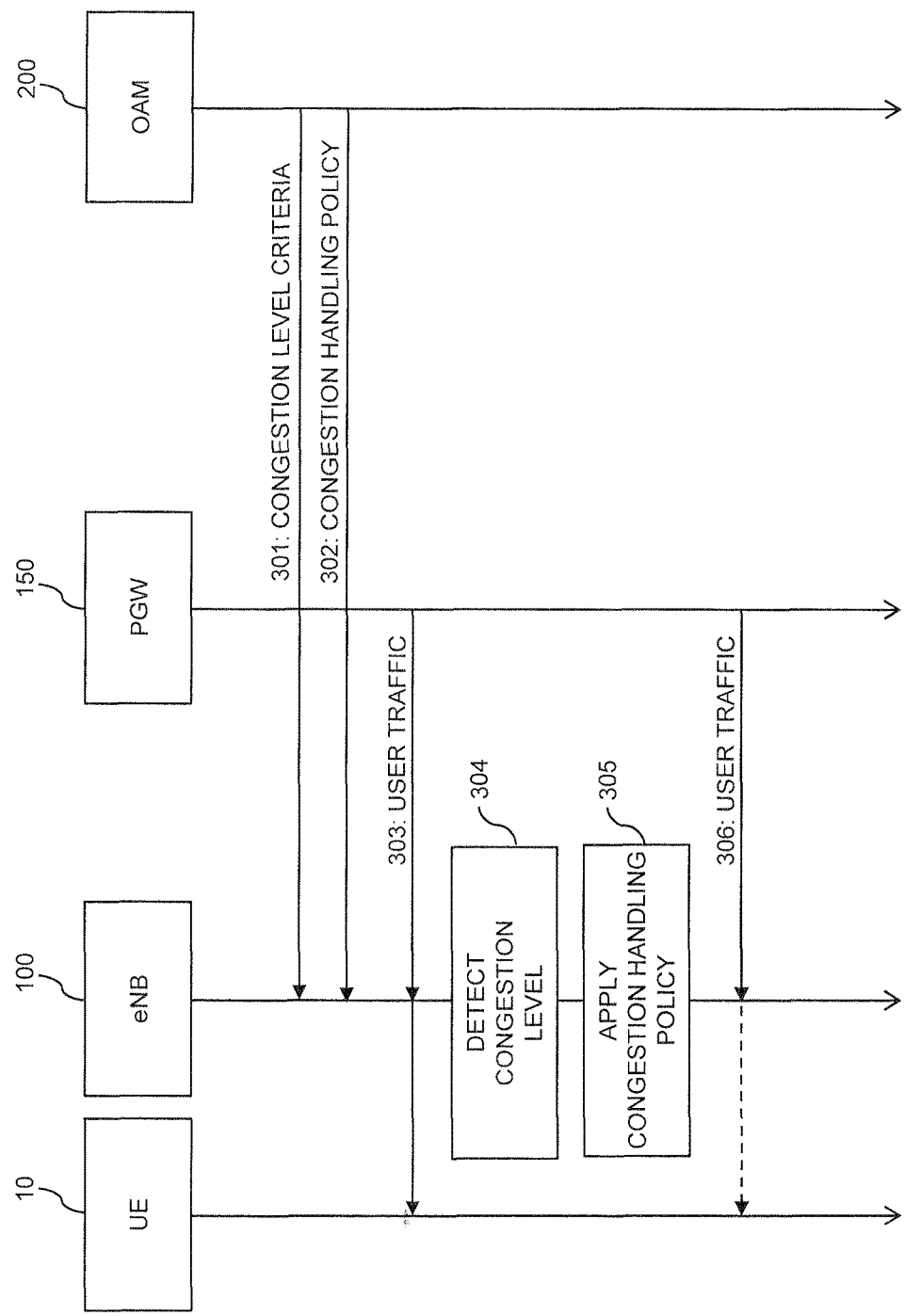
FIG. 3 schematically illustrates exemplary processes according to an embodiment of the invention.

FIG. 3 shows a timing diagram for illustrating exemplary processes which may be used for configuring a RAN node with respect to its congestion handling functionalities. In the illustrated example, this RAN node is assumed to correspond to the eNB 100. Accordingly, the congestion handling functionalities may be implemented by the above-mentioned CMF 104. Further, the processes of FIG. 3 involve the UE 10, the PGW 150, and the OAM node 200.

As illustrated, the OAM node 200 sends an indication 301 of one or more congestion level criteria to the eNB 100. These congestion level criteria define one or more congestion levels to be detected by the eNB 100. The congestion level criteria may for example include a utilization of the radio interface (e.g., in terms of a utilization of resource blocks of the radio interface by the eNB 100), a transmit power usage by the eNB 100, a number of users (or UEs) served by the eNB 100, a number of users with certain characteristics (e.g., users with traffic exceeding a certain threshold value or a number of users with non-empty buffer or a buffer occupancy above a certain threshold), a number of data packet losses experienced by the eNB 100 (e.g., in terms of a rate measured over a given time interval), a congestion bitrate (e.g., in terms of the number of bits of dropped data packets in a given time interval), a delay of data packets conveyed through the eNB 100, or a throughput of the eNB 100 (e.g., on a per user level, on a per bearer level, and/or on a per flow level). Further possible criteria may be a scheduled IP throughput for MDT (Minimization of Drive Tests), as for example defined in 3GPP TR 36.314 V11.1.0 (2012-12), or whether a given minimal target for the resource allocation can be fulfilled (e.g., in terms of a minimal bitrate target). Further, in the case that the scheduler 102 of the eNB 100 is based on a weight-based scheduling algorithm which selects a queue to serve as that queue to which currently the maximum weight is assigned (the weight being for example calculated based on a number of factors such as delay, measured bitrate, channel quality), the lowest weight that was used to serve a queue in a certain time period may also be used as a criterion for defining a congestion level. In some cases, it is also possible that values are assigned to data packets to distinguish between more or less valuable data packets. In such cases, the lowest value of a data packet which was served by the eNB 100 in a given time interval could also be used as a criterion for defining a congestion level. Further, any combination of the above-mentioned criteria could be used for defining the congestion level. For example, two or more of these criteria may be related by one or more logical operators (e.g., logical AND, logical OR, logical XOR, logical NOT, or the like). Such logical operator(s) may also be indicated in the indication 301. The determination of the congestion level criteria and the sending of the indication 301 may be accomplished by the CHMF 210 of the OAM node 200.

As further illustrated, the OAM node 200 may send an indication 302 of one or more congestion handling policies to the eNB 100. Each congestion handling policy is associated with one of the congestion levels indicated to the eNB 100 in the indication 301. Such congestion handling policy may for example be based on the above-mentioned BBR and ETP. Also the determination of the congestion handling policy and the sending of the indication 302 may be accomplished by the CHMF 210 of the OAM node 200.

On the basis of the received indications 301, 302, the eNB 100 configures the CMF 104 to detect whether one of the indicated congestion levels is reached and to then apply the congestion handling policy associated with this congestion level.

As further illustrated, the PGW 150 and eNB 100 may then convey user plane traffic 303 of the UE 10 (and typically also of other UEs). In the illustrated example, this user plane traffic is conveyed in the downlink direction from the cellular network to the UE 10. However, it should be understood that user plane traffic may also be conveyed in the uplink direction from the UE 10 to the cellular network.

As illustrated by step 304, the eNB 100 may then detect that one of the indicated congestion levels is reached. This detection is based on monitoring the criteria indicated for this congestion level while the user plane traffic is being transmitted.

At step 305, in response to detecting that the congestion level is reached, the eNB 100 applies the congestion handling policy associated with this congestion level. For example, if the congestion handling policy is based on the above-mentioned BBR and ETP, this may involve that user plane traffic below the BBR, i.e., the base traffic, is prioritized over user plane traffic above the BBR, i.e., the excess traffic. Further, this may involve that different flows of the excess traffic are prioritized based on the ETP. In FIG. 3 this is illustrated by the dashed part of the arrow corresponding to further user plane traffic 306 after detecting reaching of the congestion level at step 304.

Exemplary congestion handling policies which may be applied in the illustrated concepts will now be explained in more detail.

Figure 4:
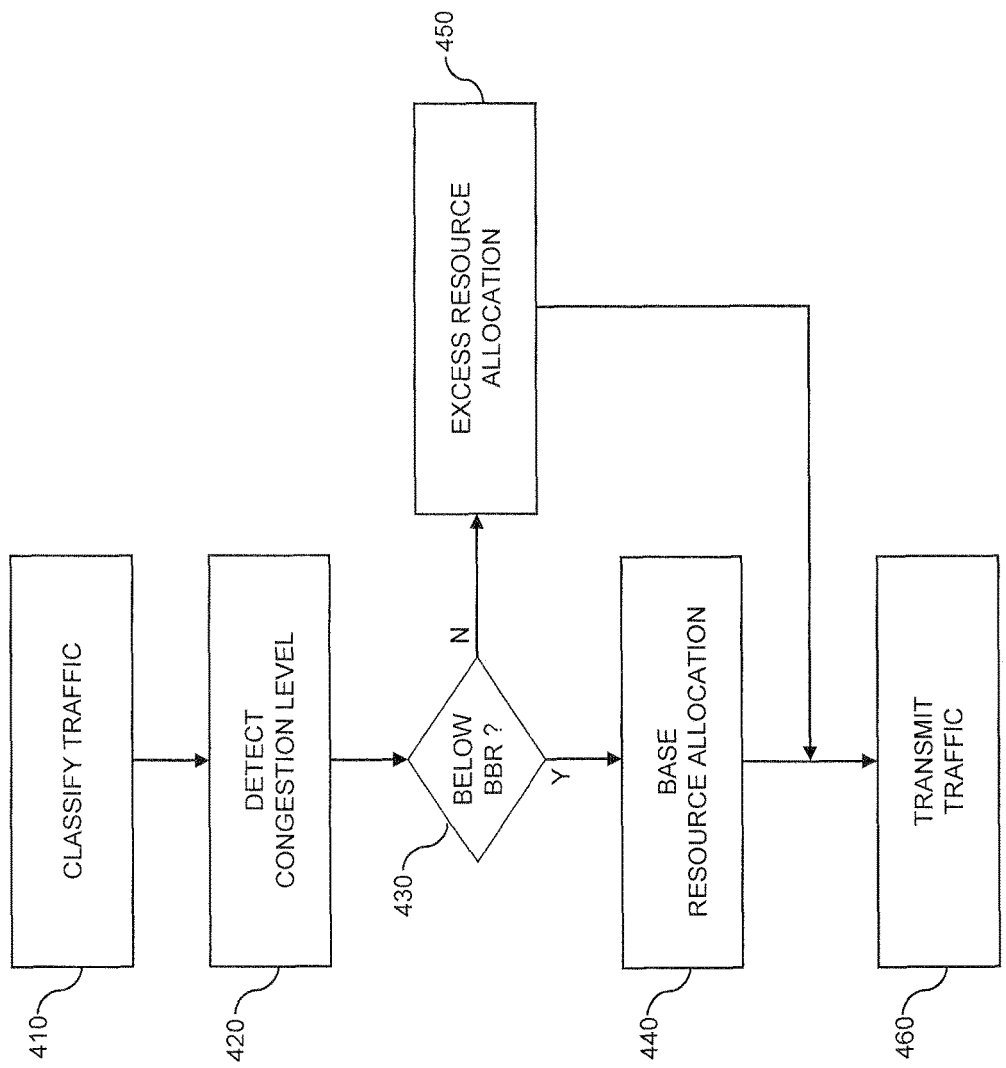
FIG. 4 shows a flowchart for illustrating a method of congestion handling according to an embodiment of the invention, using a congestion handling policy which is based on a base bitrate and an excess traffic priority.

An exemplary method for implementing a congestion handling policy on the basis of the BBR and the ETP is illustrated by FIG. 4.

In an architecture as illustrated in FIG. 1 or 2, the congestion handling in the RAN node, e.g., by the CMF 104 in the eNB 100 or by the CMF 124 in the NB 110 or RNC 120, may utilize a packet marking or bearer classification provided by the CN. In the method of FIG. 4, such classification is illustrated by step 410.

For example, the PGW 150 or GGSN 160, in particular the PCEF 152 or 162, may classify flows of downlink data packets by mapping them to an appropriate bearer identified by its QCI. Alternatively or in addition, the data packets may also be marked, e.g., by setting a protocol header field of the data packets, in the following referred to as Flow Handling Index (FHI). The classification may be accomplished on the basis of on operator policies and/or information collected by packet inspection, e.g., shallow packet inspection, deep packet inspection (DPI), heuristic analysis, or the like. Such packet inspection may be performed by the PGW 150 or GGSN 160 itself or by some other node, e.g., a Traffic Detection Function (TDF). Various criteria may be used for the classification, such as a service category (e.g., web traffic, file download, audio traffic, video traffic, or the like), an application generating the traffic (e.g., YouTube, Skype, or the like), a subscription category of a subscriber generating the traffic, e.g., a Gold, Silver, or Bronze subscription, packet header fields (e.g., a range of IP addresses or port numbers), a usage characteristic (e.g., a heavy user or light user), or any combination of such criteria.

The interface between the PGW 150 and the eNB 100 or the interface between the GGSN 160 and the RNC 120 may be based on the GPRS Tunneling Protocol (GTP) alternatively such interface may be based on the Proxy Mobile Internet Protocol (PMIP). In the case of a GTP-based interface, the FHI marking can be provided by the PGW 150 or GGSN 160 in the GTP-U header of downlink user plane packets. In the case of a PMIP-based interface, the FHI marking can be based on using DSCP markings in the inner IP header, or based on other headers such as the GRE (Generic Routing Encapsulation) header, IPsec (IP secure) header, or NSH (Network Service Header). At the SGW or SGSN, such markings can be mapped to GTP-U headers in the downlink.

In implementations which provide a TDF which performs packet inspection, the PGW 150 or GGSN 160 may perform bearer selection and optionally FHI marking based on Policy and Charging Control (PCC) rules which take into account a result of packet inspection provided by the TDF.

In some cases, the marking of data packets may also be omitted. In such cases, the RAN node, e.g., the eNB 100 or RNC 120, may apply a default rule for flows that do not have a marking.

At step 420, the RAN node, e.g., the eNB 100, NB 110, or RNC 120, may then determine whether a congestion is present and may also differentiate between multiple congestion levels. For this purpose, the congestion level criteria indicated to the RAN node are applied. The determination may involve monitoring the congestion level criteria over a given time interval, e.g., 1 min or 10 s. In some implementations such time interval may be configurable, e.g., by indicating it as a further congestion level criterion. The congestion level criteria defining each congestion level are flexible, and may thus be selected in accordance with operator requirements as well as vendor implementation preferences. The congestion level criteria may for example include a utilization of the radio interface by the RAN node, a transmit power usage by the RAN node, a number of users served by the RAN node, a number of users with certain characteristics (e.g., users with traffic exceeding a certain threshold value or a number of users with non-empty buffer or a buffer occupancy above a certain threshold), a number of data packet losses experienced by the RAN node, a congestion bitrate, a delay of data packets conveyed through the RAN node, or a throughput of the RAN node, e.g., on a per user level, on a per bearer level, and/or on a per flow level. Further possible criteria may include the scheduled IP throughput for MDT, or whether a given minimal target for the resource allocation can be fulfilled, e.g., in terms of a minimal bitrate target. Further, a lowest weight that was used by a weight-based scheduler of the RAN node (such as the schedule 102 or 122) to serve a queue in a certain time period may also be used as a criterion for defining a congestion level. In some cases, if values are assigned to data packets to distinguish between more or less valuable data packets, the lowest value of a data packet which was served by the RAN node in a given time interval could also be used as a criterion for defining a congestion level. Further, any combination of the above-mentioned criteria could be used for defining the congestion level.

An exemplary scenario with multiple congestion levels may be as follows: Congestion level 1 is reached when an average utilization of radio resources by the RAN node over a 10 s time interval exceeds 80%, congestion level 2 is reached when the average utilization of radio resources over a 10 s time interval exceeds 90%, and congestion level 3 is reached when the average utilization of radio resources by the RAN node over a 10 s interval exceeds 95%. These appropriate threshold for the congestion levels can be configured into the RAN node as part of the indicated congestion level criteria.

The congestion level criteria can be evaluated on a per cell level, on a level of multiple cells, e.g., multiple cells associated with the same eNB or RNC. Further, the congestion level criteria can be evaluated on a level of cell subregions. That is to say, a cell can be subdivided into smaller parts and the congestion level can be evaluated separately for such parts, e.g., separately for the cell center and the cell edge.

In some implementations, the congestion level(s) may be adjusted in the RAN node, e.g., on a per user or per bearer or per flow basis, using on one or more other criteria configured in the RAN. Such criteria may be indicated to the RAN node as further congestion level criteria. For example, the following adjustments are possible.

According to one option, the congestion level(s) may be adjusted depending on the radio channel quality of one or more UEs served by the RAN node. For example, a higher congestion level, i.e., corresponding to more severe resource shortage may be applied for UEs with low radio channel quality (e.g., UEs close to the cell edge) while a lower congestion level, i.e., corresponding to less severe resource shortage, may be applied for other UEs with high radio channel quality (e.g., UEs close to the cell center). This can be achieved by normalizing the a congestion metric defined by the congestion level criteria for a given congestion level with the channel quality parameters. For example, if the value R corresponds to the radio resource utilization for transmitting a single bit of user plane data and lower values of R are observed for better radio channel quality and higher values of R are observed for worse channel radio channel quality, then instead of a congestion metric C, e.g., based on one of the above-mentioned congestion level criteria, C·R may as the congestion metric such that the congestion metric increases with the radio channel quality, e.g., is higher at the cell edge. Other ways of calculating the adjusted congestion metric are possible. For example, a constant factor F could be used to weigh to what extent the radio channel quality is taken into account. This could be achieved by using C·(1+F·R) as the congestion metric, where F=0 corresponds to not considering the radio channel quality, and higher values of F correspond to considering the radio quality channel with a corresponding weight in the calculation of the congestion metric. Further, levels of the radio channel quality could be defined using thresholds, e.g., to define a levels of good radio channel quality, medium radio channel quality, and bad radio channel quality. For such different levels of radio channel quality, different thresholds could be defined by the congestion level criteria.

By considering the radio channel quality, e.g., to apply a higher congestion level at the cell edge, it is possible to achieve higher radio resource utilization, because users with low radio channel quality, who are less efficient in terms of radio resource usage, are more likely to be limited by the congestion handling policy than users with high radio channel quality. It should be noted that assuming a higher congestion level for lower radio channel quality is in line with the concepts of a well-defined congestion level, because a worse radio channel quality in fact means that less resources are available to serve a given offered traffic compared to the cell center, which in fact translates to a state of higher congestion. In some implementations, other ways of considering the radio channel quality may be utilized, as an alternative or in addition to adjusting the congestion level itself. For example the congestion handling policy could be adjusted, e.g., by adapting the BBR or ETP depending on the radio channel quality.

According to a further option, the congestion level(s) may be adjusted depending on the radio channel quality which can be expected for one or more UEs served by the RAN node, thereby taking into account certain cell selection mechanisms, smart antenna mechanisms, or other optimization mechanisms implemented in the RAN. For example, using such mechanisms the RAN node may decide to direct some UEs to other cells, e.g., a supplementary small cell within the coverage region of the main cell served by the RAN node, thereby allowing to serve these UEs more efficiently in terms of performance and/or overall radio capacity. In such cases, the UEs may for example suffer from low radio channel quality, but a better radio channel quality can be expected after utilizing the optimization mechanism. It may therefore be beneficial to consider such expected radio channel quality in the adjustment of the congestion level. This may be accomplished in a similar manner as explained above for the actual radio channel quality. Accordingly, when the RAN node has capabilities to reduce radio resource consumption by certain UEs, this can be regarded as a congestion management tool, which means that a lowered congestion level can be applied for these UEs. On the other hand, if such capabilities are not available the congestion level may be increased.

According to a further option, the congestion level(s) may be adjusted depending on a type of traffic. If the RAN node becomes aware of the traffic classification, e.g., in terms of a bearer assignment and/or marking of data packets, such as performed in step 410, this classification may be taken into account by the congestion level criteria. For example, certain congestion level criteria can be defined to be applicable to one specific type of traffic or a group of traffic types. Again, such criteria may be combined using logical operators. By way of example, a given congestion level can be defined to be reached either when the overall radio resource utilization reaches a certain threshold, or when a type of traffic, e.g., video traffic, reaches another threshold. By using traffic specific criteria, the operator flexibility for efficient congestion management can be improved. The traffic type may for example be distinguished with respect to, e.g., application type. Further, such distinction between traffic types can also consider which traffic has more stringent service characteristics. For example, it is also possible to define congestion level criteria based which consider whether traffic which is more sensitive to delay experiences a delay exceeding a certain threshold.

In the method of FIG. 4, it is assumed that the RAN node has configuration which governs how to handle a given traffic class, e.g., identified by a specific QCI and FHI as assigned at step 410. For each traffic class, there can be a separate configuration per congestion level. Each configuration (per congestion level, per traffic class) defines a combination of BBR and optionally ETP. However, it is also possible that for some traffic classes may have no BBR and ETP is defined, e.g., if the operator does not wish to limit the this traffic class at a specific level of congestion. In addition, the configuration can also contain other parameters such as parameters how to consider radio channel quality, or parameters for application specific optimizations. Such application specific optimizations may apply, e.g., to video traffic or to sending the traffic in certain bursts. The configuration and its parameters may be indicated, e.g., by the OAM node 200, as part of the congestion policy.

At step 430, after having detected that a certain congestion level is reached, the RAN node considers the BBR defined in the congestion handling policy for this congestion level. In particular, it checks whether certain incoming traffic is below the BBR. This can for example be achieved by using a token bucket mechanism. If the incoming traffic is below the BBR, the traffic is considered as base traffic and the method continues with step 440, as indicated by branch "Y".

At step 440, the RAN node performs base resource allocation for the base traffic. This may be implemented by the scheduler 102 or 122. This can be accomplished substantially in the same way as scheduling in a non-congested state. For example, the resources may be allocated in accordance with its associated QCI and/or other packet marking. Such packet marking may for example be used for additional differentiation, e.g., with respect to prioritization or other purposes.

If the traffic is not below the BBR, it is considered as excess traffic, and the method continues with step 450, as indicated by branch "N". At step 450, the RAN node performs excess resource allocation. This may be implemented by the scheduler 102 or 122. The excess resource allocation is performed in such a manner that the excess traffic is handled with a lower priority than the base traffic. Accordingly, for the excess traffic there is a higher likelihood of data packets being dropped than for the base traffic. If there are multiple flows in the excess traffic, the optional ETP is used to assign relative priorities between these flows. Various prioritization mechanisms may be used for this purpose. For example, it is possible to use a strict absolute priority assigned to certain flows, which means that these flows are always prioritized over other flows, and/or a relative priority mechanism where higher priority flows are preferred over lower priority flows in terms of the amount of allocated resources. One way to achieve such relative priorities may be to use different drop probabilities depending on the priority in an AQM mechanism. The ETP may be the same as the priority associated with the QCI and/or packet marking used for the handling of traffic in a non-congested state.

At step 460, the RAN node may then initiate transmission of the traffic using the resources allocated at step 440 or 450. If the RAN node is an eNB, such as the eNB 100, the RAN node may directly send the traffic over the radio interface. If the RAN node is an RNC, such as the RNC 120, it may control the appropriate NB to send the traffic over the radio interface.

As can be seen, in the method of FIG. 4 the excess traffic is not actively dropped. Rather, the RAN node attempts to schedule also the excess traffic when there are resources left by the base traffic.

Figure 5:
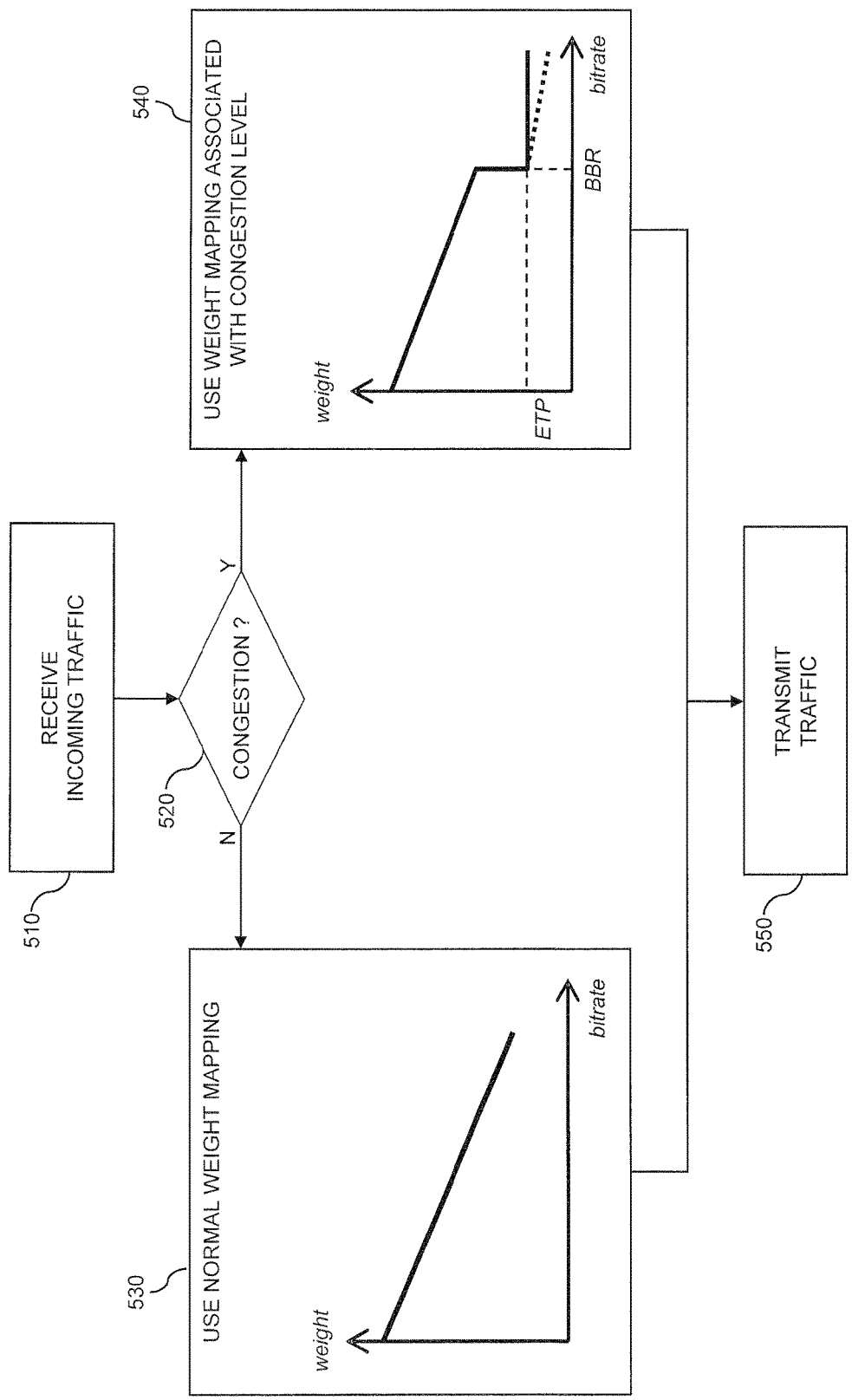
FIG. 5 shows a flowchart for illustrating a method of congestion handling according to an embodiment of the invention, in which congestion mitigation is realized by a scheduler of the RAN node.

FIG. 5 illustrates a method which may be used for implementing a congestion handling policy in a scheduler, such as the scheduler 102 or 122. Accordingly, in this implementation, the CMF 104, 124 may be regarded as being a functional part of the scheduler 102, 122. In this implementation, the scheduler is assumed to utilize a weight-based scheduling algorithm for the resource allocation process. This typically means that the scheduler considers a queue with the highest weight for resource allocation. The weight can be calculated using a combination of criteria which also include a bitrate allocation that the traffic of the queue has recently received, in terms of a mapping of weights to bitrates.

At step 510, the RAN node receives incoming traffic, and at step 520, the RAN node determines whether a congestion is present. Here, it should be understood that this congestion will also correspond to a certain congestion level as discussed above. If no congestion is present, the method continues with step 530, as illustrated by branch "N".

At step 530, the scheduler applies a normal mapping of weights to bitrates to perform the resource allocation. As illustrated in FIG. 5, such normal weight mapping may for example involve that the weight decreases as a function of the bitrate, e.g., linearly. Accordingly, for traffic with higher bitrate the weight will be reduced as compared to traffic with lower bitrate. In this way fairness between the different queues can be achieved because queues which have recently used less bitrate are more likely to be considered in the resource allocation process.

If the determination of step 520 shows that a congestion is present, the method continues with step 540, as indicated by branch "Y".

At step 540, the scheduler applies a modified mapping of weights to bitrates to perform the resource allocation. This modified mapping may be defined as part of the congestion handling policy associated with the detected congestion level. As illustrated in FIG. 5, such modified mapping may involve that a step is introduced into the decreasing curve of the normal mapping. At the step, the decreasing function representing the mapping abruptly drops to a low value. After the step, the function may constantly maintain the low value or, as indicated by the, dotted line, further decrease as a function of the bitrate. As indicated in FIG. 5, the step may be located at a bitrate corresponding to the BBR and the low value may correspond to the ETP. By selecting a sufficient size for the drop at the BBR, depending on the detailed configuration of calculating the weights, the step may be used to provides the desired prioritization of the excess traffic over the base traffic. In particular, the drop may be dimensioned sufficiently large that the excess traffic will always achieve a lower weight than the base traffic, irrespective of any other parameters used in the calculation of the weight. The further decrease as illustrated by the dotted line may be used to achieve fairness in the handling of the excess traffic.

At step 550, RAN node may initiate transmission of the traffic using the resources allocated by the scheduler in step 530 or 540.

Figure 6:
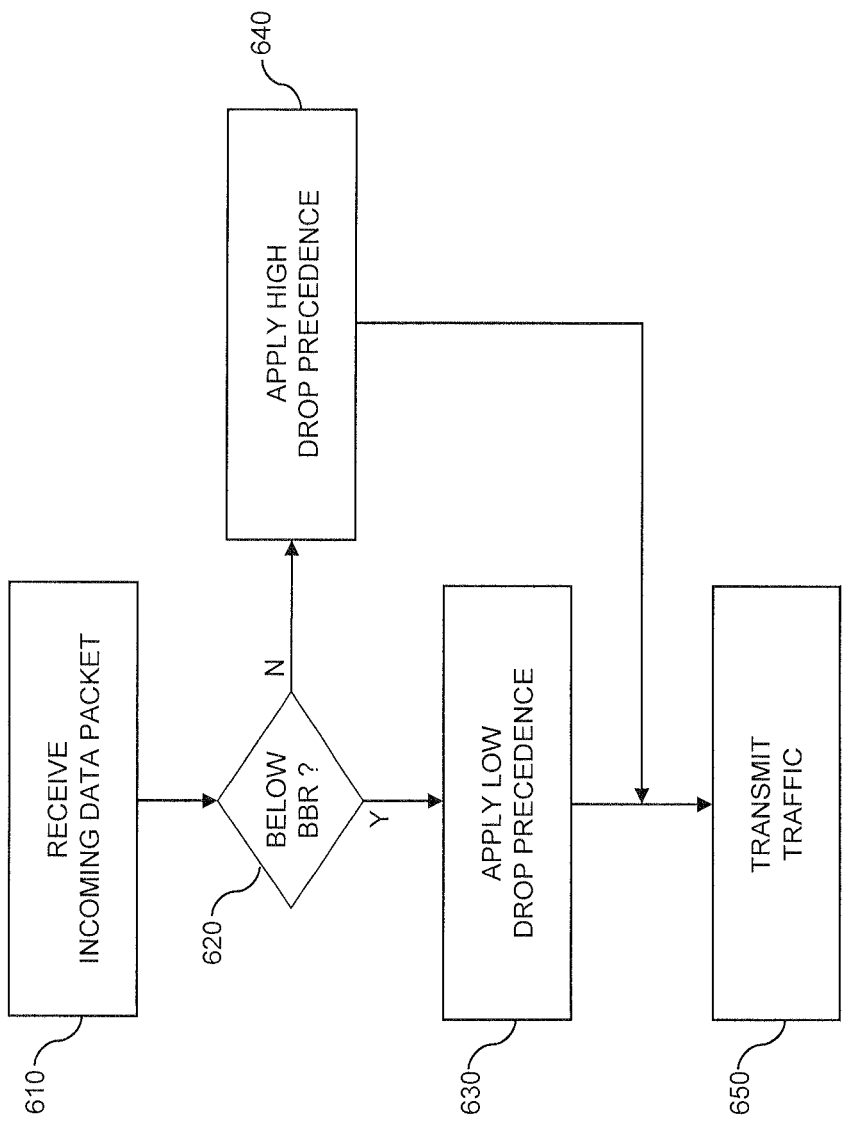
FIG. 6 shows a flowchart for illustrating a method of congestion handling according to an embodiment of the invention, in which congestion mitigation is realized on the basis of packet drop precedence values.

FIG. 6 illustrates a method which may be used for implementing a congestion handling policy by using a packet drop precedence. This may be implemented by providing the CMF 104, 124 with an AQM mechanism or by implementing the CMF 104, 124 as part of an existing AQM mechanism of the RAN node. The AQM mechanism is assumed to generally operate on the basis of a drop probability which is an increasing function of a drop precedence value. The drop probability may also depend on the current queue length of the queues at the scheduler 102, 122. For example, the total queue length can be used, or a queue length per UE or per QCI. In case of a short queue typically no data packets will be actively dropped by the AQM mechanism. With higher queue length, data packets may be dropped, and the higher the drop precedence of the data packet, the more likely it is that it will be dropped. There may be various ways of setting the exact dependence of the drop probability on the input parameters of the AQM mechanism.

At step 610, the RAN node receives an incoming data packet, and at step 620, the RAN node determines whether the data packet is associated with data traffic below the BBR associated with the detected congestion level. If the traffic is below the BBR, the method continues with step 630, as illustrated by branch "Y".

At step 630, the RAN node applies the AQM mechanism with a low drop precedence value, e.g., corresponding to no active dropping of data packets at any queue length.

At step 640, the RAN node applies the AQM mechanism with a high drop precedence value, which is higher than the low precedence value of step 630. If also the ETP is configured for this congestion level, the drop precedence value may selected to be a decreasing function of the ETP. That is to say, the lower the ETP the higher the drop precedence value.

A solution based on an AQM mechanism as illustrated in FIG. 6 may be applied by the RAN node before PDCP and RLC processing takes place. This improves compatibility of the solution with packet-marking based traffic classification and 3G ($3^{rd}$ Generation) network technology, such as UMTS with or without HSPA.

Figure 7:
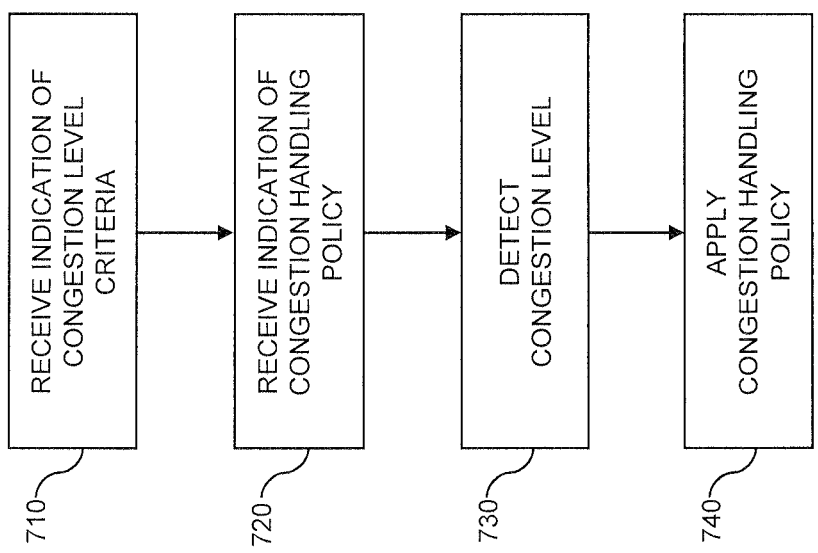
FIG. 7 shows a flowchart for illustrating a method according to an embodiment of the invention, which may be used for implementing configurable congestion handling in a RAN node.

FIG. 7 shows a flowchart for illustrating a method of congestion handling. The method of FIG. 7 may be used for implementing the above concepts in a RAN node of a cellular network, e.g., in eNB 100, NB 110, or RNC 120. If a processor based implementation of the RAN node is used, the steps of the method may be performed by one or more processors of the RAN node. For this purpose, the processor(s) may execute correspondingly configured program code. Further, at least some of the corresponding functionalities may be hardwired in the processor(s).

At step 710, the RAN node receives an indication of one or more criteria defining one or more congestion levels. These criteria may be selected from the group consisting of: a radio interface resource utilization of the RAN node, a transmit power utilization of the RAN node, a number of users meeting one or more selection criteria (e.g., users connected to the RAN node, users with excess traffic, users with non-empty buffer(s), users with buffer occupancy above a threshold), a number of packet losses at the RAN node, an amount of dropped user plane traffic, a delay of user plane traffic through the RAN node, a throughput of user plane traffic through the radio RAN node (e.g., on a per user level, per bearer level, and/or per traffic flow level), scheduled IP throughput for MDT with respect to the RAN node, a minimal target for resource allocation by the RAN node, a lowest weight of a queue as selected for serving by a weight-based scheduler of the RAN node, and a lowest classification value of a data packet served by the RAN node. Further, any combination of such criteria may be used. For example, if the indication includes a plurality of criteria, it may also include one or more logical operators relating the plurality of criteria.

The congestion level may be defined on a per bearer level, i.e., the criteria may be defined to be evaluated for a certain bearer. Further, the congestion level may be defined on a per cell level, i.e., the criteria may be defined to be evaluated for a certain cell. Further, the congestion level may be defined on a cell subregion level, i.e., the criteria may be defined to be evaluated on the level of a certain subregion of a cell, e.g., for the cell center or cell edge. Further, the congestion level may be defined on a per user level, i.e., the criteria may be defined to be evaluated for a certain user or group of users. Further, the congestion level may be defined on a per traffic type level, i.e., the criteria may be defined to be evaluated for a certain traffic type.

In some implementations, the congestion level may be defined to depend on a radio channel quality experienced by a UE or on a radio channel quality expected to be achievable for a UE. This may be implemented by using a congestion metric which defined by one or more of the indicated criteria in such a way that it depends on the actual radio channel quality or expected radio channel quality, e.g., using calculations as outlined above.

At step 720, the RAN node receives for each of the congestion level(s) defined by the criteria of step 710, an indication of a congestion handling policy associated with this congestion level. The indications of step 710 and 720 may be received in the same message or in different messages. In some scenarios, the indications of steps 710 and 720 may also be received from different sources. For example, the indication of step 710 could be received from an OAM node while the indication of step 720 is received from a CN node, such as a PGW, a GGSN, an MME, an SGSN, or a PCRF.

The congestion handling policy may define a base bitrate, e.g., the above-mentioned BBR. Optionally, the congestion handling policy may also define a priority order of different traffic flows of the user plane traffic above the base bitrate, e.g., the above-mentioned ETP.

At step 730 one of the congestion levels is detected. That is to say, the RAN node determines, depending on the criteria indicated in step 710, whether one of the congestion level(s) is reached.

At step 740, in response to the determination of step 730 that the congestion level is reached, the RAN node applies the congestion handling policy associated with this congestion level.

If the congestion handling policy defines a base bitrate, the RAN node may apply the congestion handling policy by assigning user plane traffic above the bitrate a lower priority than user plane traffic up to the base bitrate. If the congestion handling policy defines a priority order of different traffic flows of the user plane traffic above the base bitrate, application of the congestion policy may also involve prioritization of these traffic flows according to the priority order.

Figure 8:
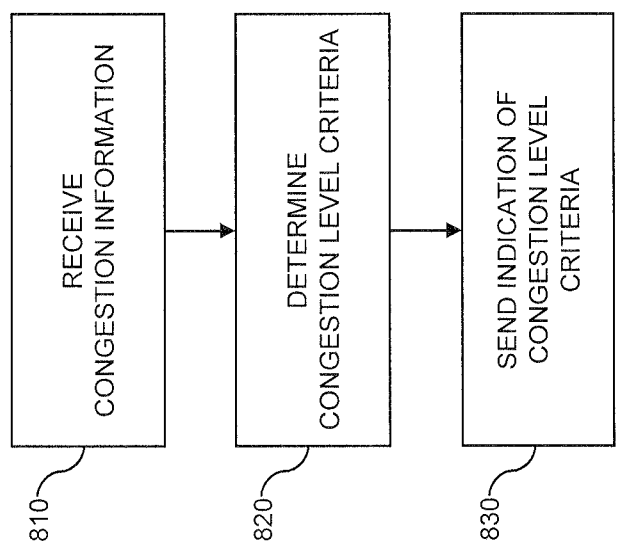
FIG. 8 shows a flowchart for illustrating a method according to an embodiment of the invention, which may be used for implementing management of congestion handling by a network node.

FIG. 8 shows a flowchart for illustrating a method of managing congestion handling. The method of FIG. 8 may be used for implementing the above concepts in a network node of a cellular network, e.g., in an OAM node such as the above-mentioned OAM node 200. In some implementations, the network node may also be a CN node, e.g., a gateway such as the PGW 150 or GGSN 160, or an MME, an SGSN or a PCRF. If a processor based implementation of the network node is used, the steps of the method may be performed by one or more processors of the network node. For this purpose, the processor(s) may execute correspondingly configured program code. Further, at least some of the corresponding functionalities may be hardwired in the processor(s).

At step 810, the network node may receive congestion information, e.g., in terms of statistic on congestions in a RAN of the cellular network.

At step 820, the network node of the cellular network determines one or more criteria defining one or more congestion levels to be detected by at least one RAN node of the cellular network. Such RAN node may for example correspond to an eNB, such as the eNB 100, to an NB, such as the NB 110, or to an RNC, such as the RNC 120. This determination may be based on the congestion information received at step 810. Further, this determination may be based on manual inputs.

The criteria determined at step 820 may be selected from the group consisting of: a radio interface resource utilization of the RAN node, a transmit power utilization of the RAN node, a number of users meeting one or more selection criteria (e.g., users connected to the RAN node, users with excess traffic, users with non-empty buffer(s), users with buffer occupancy above a threshold), a number of packet losses at the RAN node, an amount of dropped user plane traffic, a delay of user plane traffic through the RAN node, a throughput of user plane traffic through the radio RAN node (e.g., on a per user level, per bearer level, and/or per traffic flow level), scheduled IP throughput for MDT with respect to the RAN node, a minimal target for resource allocation by the RAN node, a lowest weight of a queue as selected for serving by a weight-based scheduler of the RAN node, and a lowest classification value of a data packet served by the RAN node. Further, any combination of such criteria may be used. For example, if the indication includes a plurality of criteria, it may also include one or more logical operators relating the plurality of criteria.

The congestion level may be defined on a per bearer level, i.e., the criteria may be defined to be evaluated for a certain bearer. Further, the congestion level may be defined on a per cell level, i.e., the criteria may be defined to be evaluated for a certain cell. Further, the congestion level may be defined on a cell subregion level, i.e., the criteria may be defined to be evaluated on the level of a certain subregion of a cell, e.g., for the cell center or cell edge. Further, the congestion level may be defined on a per user level, i.e., the criteria may be defined to be evaluated for a certain user or group of users. Further, the congestion level may be defined on a per traffic type level, i.e., the criteria may be defined to be evaluated for a certain traffic type.

In some implementations, the congestion level may be defined to depend on a radio channel quality experienced by a UE or on a radio channel quality expected to be achievable for a UE. This may be implemented by using a congestion metric which defined by one or more of the indicated criteria in such a way that it depends on the actual radio channel quality or expected radio channel quality, e.g., using calculations as outlined above.

Further, the node may also determine, for at least one of the congestion levels, a congestion handling policy to be applied by the at least one RAN node in response to determining that this congestion level is reached. Also this determination may be based on the congestion information received at step 810 and/or on manual inputs.

The congestion handling policy may define a base bitrate, e.g., the above-mentioned BBR. And application of the congestion handling policy may involve assigning user plane traffic above the bitrate a lower priority than user plane traffic up to the base bitrate. Optionally, the congestion handling policy may also define a priority order of different traffic flows of the user plane traffic above the base bitrate, e.g., the above-mentioned ETP. In this case, application of the congestion handling policy may also involve prioritization of these traffic flows according to the priority order.

At step 830, the network node sends an indication of the determined criteria to the at least one RAN node. Further, if also the at least one congestion handling policy is determined at step 820, the network node may also send an indication of the at least one congestion handling policy to the at least one RAN node.

It is to be understood that the methods of FIGS. 7 and 8 may be combined in a system which includes one or more RAN nodes operating according to the method of FIG. 7 and a network node operating according to the method of FIG. 8.

Figure 9:
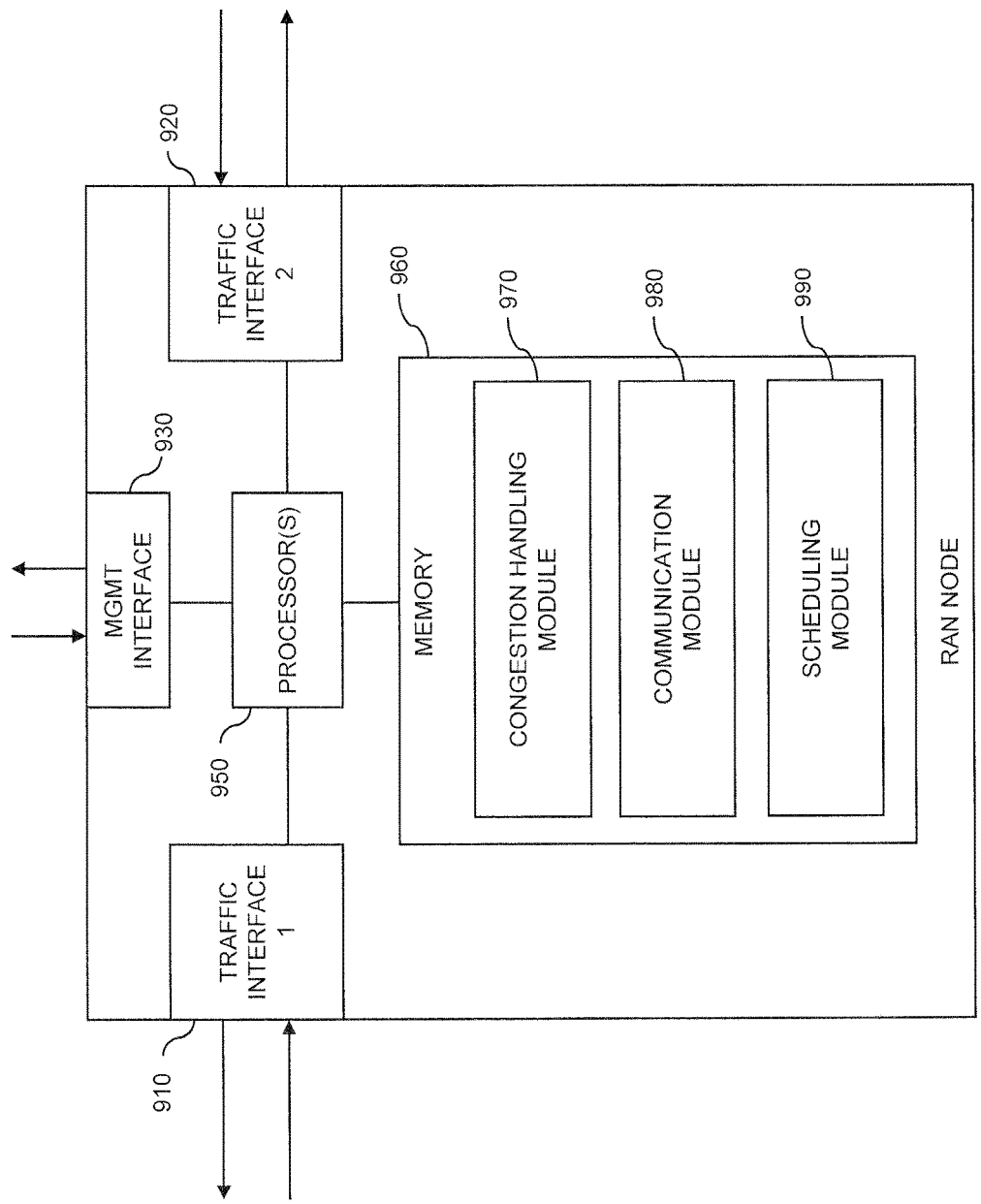
FIG. 9 schematically illustrates structures of a RAN node according to an embodiment of the invention.

FIG. 9 illustrates exemplary structures for implementing a RAN node which operates in accordance with the above concepts. For example, the illustrated structures may be used to implement the eNB 100, the NB 110, or RNC 120.

In the illustrated example, the RAN node includes a first traffic interface 910 for communication with one or more UEs and a second traffic interface for communication with other network nodes, such as one or more gateways in the CN. If the RAN node is implemented as an eNB, the first traffic interface 910 may correspond to a radio interface. If the RAN node is implemented as an RNC, the first traffic interface 910 may correspond to an interface with respect to one or more NBs providing the radio interface to the UEs. Further, the RAN node includes a management (MGMT) interface 930, which may be used for communication for management purposes, e.g., with an OAM node such as the OAM node 200. The management interface 930 may for example be used for receiving the above-mentioned indications.

Further, the RAN node includes one or more processor(s) 950 coupled to the interfaces 910, 920 and 930, and a memory 960 coupled to the processor(s) 950. The memory 960 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 960 includes suitably configured program code modules to be executed by the processor(s) 950 so as to implement the above-described functionalities of the RAN node, e.g., corresponding to the method steps of FIG. 7. More specifically, the program code modules in the memory 960 may include a congestion handling module 970 so as to implement the above-described functionalities of detecting a congestion level and applying the associated congestion handling policy. Further, the program code modules in the memory 960 may include a communication module 980 so as to implement the above-described functionalities of receiving the indication of criteria defining one or more congestion levels or of congestion handling policies. Still further, the memory 960 may include a scheduling module 990 so as to implement the above-mentioned functionalities of scheduling traffic.

It is to be understood that the structures as illustrated in FIG. 9 are merely schematic and that the RAN node may actually include further components which, for the sake of clarity, have not been illustrated, e.g., further interfaces or further processors. Also, it is to be understood that the memory 960 may include further types of program code modules, which have not been illustrated, e.g., program code modules for implementing known functionalities of a RAN node, such as an eNB or RNC. In some implementations, also a computer program may be provided for implementing functionalities of the RAN node, e.g., in the form of a physical medium storing the program code modules to be stored in the memory 960 or by making such program code available for download or streaming.

Figure 10:
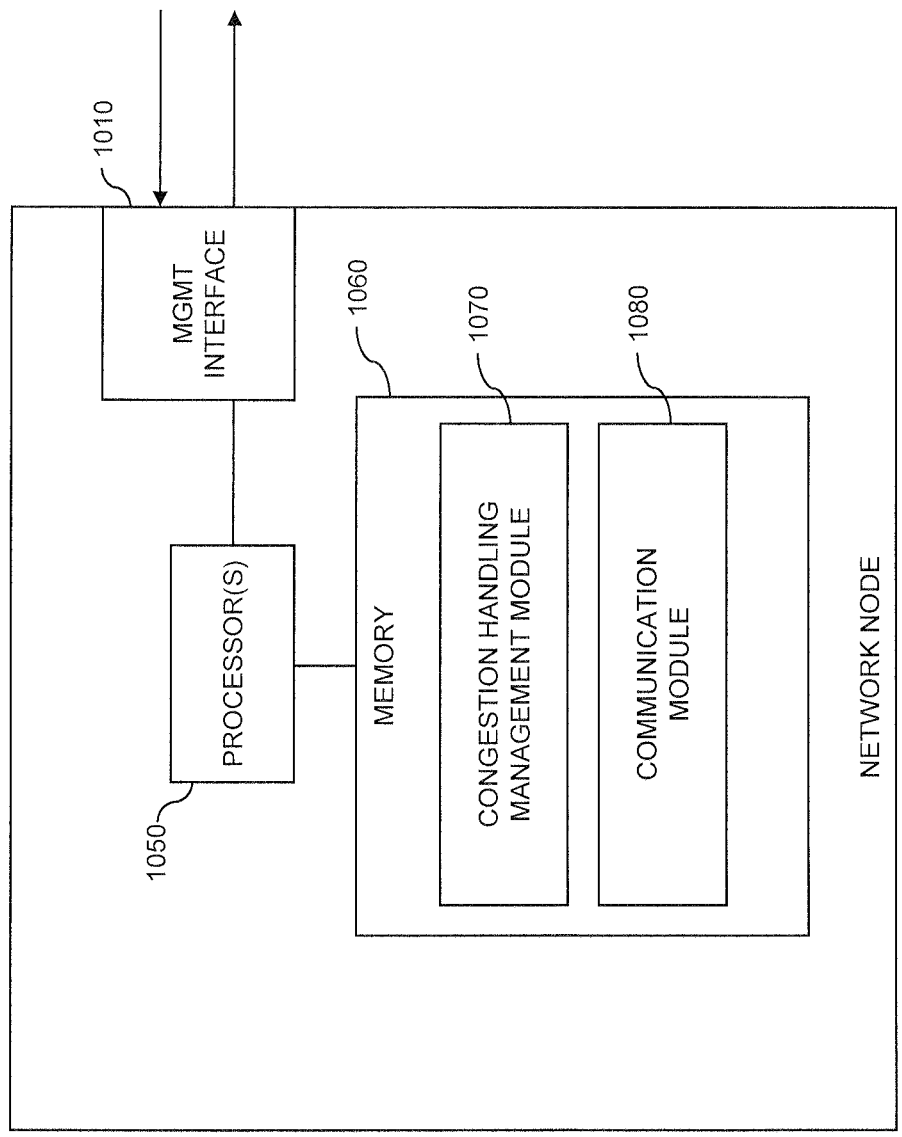
FIG. 10 schematically illustrates structures of a network node according to an embodiment of the invention.

FIG. 10 illustrates exemplary structures for implementing a network node which operates in accordance with the above concepts. For example, the illustrated structures may be used to implement the OAM node 200. However, the network node may also correspond to other kinds of network nodes, e.g., to a gateway such as the PGW 150, GGSN 160, MME 180, or PCRF 190.

In the illustrated example, the network node includes a management interface 1010 for communication with one or more RAN nodes. The management interface 1010 may for example be used for sending the above-mentioned indications or for receiving congestion information from the RAN.

Further, the network node includes one or more processor(s) 1050 coupled to the interface 1010 and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code modules to be executed by the processor(s) 1050 so as to implement the above-described functionalities of the network node, e.g., corresponding to the method steps of FIG. 8. More specifically, the program code modules in the memory 1060 may include a congestion management module 1070 so as to implement the above-described functionalities of determining criteria defining one or more congestion levels and/or determining one or more congestion handling policies associated with such congestion levels. Further, the program code modules in the memory 1060 may include a communication module 1080 so as to implement the above-described functionalities of sending the indication of criteria defining one or more congestion levels and/or sending the indication of one or more congestion handling policies.

It is to be understood that the structures as illustrated in FIG. 10 are merely schematic and that the network node may actually include further components which, for the sake of clarity, have not been illustrated, e.g., further interfaces or further processors. Also, it is to be understood that the memory 1060 may include further types of program code modules, which have not been illustrated, e.g., program code modules for implementing known functionalities of a network node, such as an OAM node, gateway, MME, or PCRF. In some implementations, also a computer program may be provided for implementing functionalities of the network node, e.g., in the form of a physical medium storing the program code modules to be stored in the memory 1060 or by making such program code available for download or streaming.

As can be seen, the concepts as described above may be used for efficiently and flexibly implementing congestion handling in a cellular network. For example, by allowing the operator to configure the BBR and ETP for different traffic classes, the operator is provided with a flexible way of configuring congestion handling, in particular when considering traffic types which are highly susceptible to causing congestions, such as video traffic. The operator may decide to limit traffic classes which are considered as less important, which allows a higher quality of experience for other traffic classes that are either not limited or limited at a higher threshold. By down-prioritizing the excess traffic, as opposed to actively dropping the excess traffic, it may be possible to achieve high utilization because remaining capacity is utilized by the excess traffic. Implementing the congestion mitigation functionalities in the RAN node allows for efficiently considering for example the radio channel quality in the congestion handling process. Again, this may help to improve radio resource utilization. Further, the concepts allow for achieving compatibility with existing RAN mechanisms, including dynamic cell selection or smart antenna techniques. Further, system instability due to oscillations can be avoided. For example, the concepts may avoid unnecessary low utilization values in the case of a congestion. Further, fast response times can be achieved by the RAN-based implementation. Further, the concepts provide a high degree of flexibility. For example, the congestion level criteria allow for selection an appropriate congestion metric for various application scenarios. Still further, the concepts may be realized with low complexity, e.g., using the above-mentioned scheduling-weight based mechanism (as explained in connection with FIG. 5) or drop-precedence based mechanism (as explained in connection with FIG. 6).

It is to be understood that the examples and embodiments as explained above are merely illustrative and susceptible to various modifications. For example, the concepts could be applied in various kinds of RAN nodes, including intermediate transport nodes. Still further, various communication protocols may be used for providing the indications to the RAN node, including DIAMETER based protocols or IP based protocols, such as HTTPS (Hypertext Transfer Protocol Secure), the S1 Application Protocol (S1-AP) of the LTE technology, the Radio Access Network Application Part (RANAP) or Node B Application Part (NBAP) protocol of the UMTS technology. Further, although the above descriptions have a focus on the handling of downlink traffic, the concepts could be applied in a corresponding manner to uplink traffic.

Further, the illustrated concepts could be used in connection with various types of cellular network technologies, without limitation to the above-mentioned LTE technology or UMTS technology. Moreover, it is to be understood that the above concepts may be implemented by using correspondingly designed software to be executed by one or more processors of an existing device or network node, or by using dedicated hardware.

The invention claimed is:

1. A method of congestion handling in a cellular network, the method comprising:
   a radio access network node of the cellular network receiving an indication of one or more criteria defining one or more congestion levels, and, for each of the one or more congestion levels, an indication of a congestion handling policy associated with this congestion level;
   the radio access network node determining whether one of the one or more congestion levels is reached based on the one or more criteria; and
   in response to determining that one of the one or more congestion levels is reached, the radio access network node applying the congestion handling policy associated with the corresponding congestion level,
   wherein the congestion handling policy defines a base bitrate, and the radio access network node applies the congestion handling policy by assigning a lower priority to user plane traffic above the base bitrate than user plane traffic up to the base bitrate, and
   wherein the congestion handling policy is further applied by one of (a) applying a modified mapping of weights to bitrates to perform resource allocation and transmitting of a traffic using resources allocated by a scheduler, and (b) by applying an Active Queue Management (AQM) mechanism with no active dropping of data packets at any queue length,
   wherein the congestion handling policy defines a priority order of different traffic flows of the user plane traffic above the base bitrate.

2. The method of claim 1, wherein the congestion level is at least one of:
   defined on a per bearer level;
   defined on a per cell level;
   defined on a cell subregion level;
   defined on a per user level;
   defined on a per traffic type level;
   defined to depend on a radio channel quality experienced by a user equipment; and
   defined to depend on a radio channel quality expected to be achievable for a user equipment.

3. The method of claim 1, wherein the one or more criteria are selected from the group consisting of:
   a radio interface resource utilization of the radio access network node;
   a transmit power utilization of the radio access network node;
   a number of users meeting one or more selection criteria;
   a number of packet losses at the radio access network node;
   an amount of dropped user plane traffic;
   a delay of user plane traffic through the radio access network node;
   a throughput of user plane traffic through the radio access network node;
   scheduled Internet Protocol throughput for Minimization of Drive Tests with respect to the radio access network node;
   a minimal target for resource allocation by the radio access network node;
   a lowest weight of a queue as selected for serving by a weight-based scheduler of the radio access network node; and
   a lowest classification value of a data packet served by the radio access network node.

4. The method of claim 1, wherein the indication defines a plurality of the criteria and one or more logical operators relating the plurality of the criteria.

5. A method of managing congestion handling in a cellular network, the method comprising:
   a network node of the cellular network determining one or more criteria defining one or more congestion levels to be detected by at least one radio access network node of the cellular network,
   wherein the network node determines, for at least one of the one or more congestion levels, a congestion handling policy associated with the congestion level and to be applied by the at least one radio access network node in response to determination of the congestion level is reached, wherein the congestion handling policy defines a base bitrate, and the congestion handling policy is to be applied by assigning user plane traffic above the base bitrate a lower priority than user plane traffic up to the base bitrate, wherein the congestion handling policy defines a priority order of different traffic flows of the user plane traffic above the base bitrate, and wherein the one or more criteria are selected from the group consisting of:
- a radio interface resource utilization of the radio access network node,
- a transmit power utilization of the radio access network node,
- a number of users meeting one or more selection criteria,
- a number of packet losses at the radio access network node,
- an amount of dropped user plane traffic,
- a delay of user plane traffic through the radio access network node,
- a throughput of user plane traffic through the radio access network node,
- scheduled Internet Protocol throughput for Minimization of Drive Tests with respect to the radio access network node,
- a minimal target for resource allocation by the radio access network node,
- a lowest weight of a queue as selected for serving by a weight-based scheduler of the radio access network node, and
- a lowest classification value of a data packet served by the radio access network node; and the network node sending an indication of the one or more criteria to the at least one radio access network node.

6. The method of claim 5, further comprising:
the network node receiving congestion information from the at least one radio access node; and
the network node determining the criteria depending on the received congestion information.

7. The method of claim 5, further comprising:
the network node sending an indication of the congestion handling policy to the at least one radio access network node.

8. The method of claim 5, wherein the congestion level is at least one of
defined on a per bearer level;
defined on a per cell level;
defined on a cell subregion level;
defined on a per user level;
defined on a per traffic type level;
defined to depend on a radio channel quality experienced by a user equipment;
defined to depend on a radio channel quality expected to be achievable for a user equipment.

9. The method of claim 5, wherein the indication defines a plurality of the criteria and one or more logical operators relating the plurality of the criteria.

10. A radio access network node for a cellular network, the radio access network node comprising:
at least one interface; and
at least one processor;
memory containing instructions executable by the at least one processor
wherein the radio access node is operative to:
receive an indication of one or more criteria defining one or more congestion levels and, for each of the one or more congestion levels, an indication of a congestion handling policy associated with this congestion level;
determine whether one of the one or more congestion levels is reached based on the one or more criteria; and
in response to determining that one of the one or more congestion levels is reached, apply the congestion handling policy associated with this congestion level,
wherein the congestion handling policy defines a base bitrate, and the radio access network node applies the congestion handling policy by assigning a lower priority to user plane traffic above the base bitrate than user plane traffic up to the base bitrate,
wherein the congestion handling policy is further applied by one of (a) applying a modified mapping of weights to bitrates to perform resource allocation and transmitting of a traffic using resources allocated by a scheduler, and (b) by applying an Active Queue Management (AQM) mechanism with no active dropping of data packets at any queue length, and
wherein the congestion handling policy defines a priority order of different traffic flows of the user plane traffic above the base bitrate.

11. The radio access network node of claim 10, wherein the congestion level is at least one of:
defined on a per bearer level;
defined on a per cell level;
defined on a cell subregion level;
defined on a per user level;
defined on a per traffic type level;
defined to depend on a radio channel quality experienced by a user equipment;
defined to depend on a radio channel quality expected to be achievable for a user equipment.

12. The radio access network node of claim 10, wherein the indication defines a plurality of the criteria and one or more logical operators relating the plurality of the criteria.

13. A network node for a cellular network, the network node comprising:
at least one interface; and
at least one processor;
memory containing instructions executable by the at least one processor wherein the network node is operative to:
determine one or more criteria defining one or more congestion levels to be detected by at least one radio access network node of the cellular network,
wherein the network node determines, for at least one of the one or more congestion levels, a congestion handling policy associated with the congestion level and to be applied by the at least one radio access network node in response to determination of the congestion level is reached,
wherein the congestion handling policy defines a base bitrate, and the congestion handling policy is to be applied by assigning user plane traffic above the base bitrate a lower priority than user plane traffic up to the base bitrate,
wherein the congestion handling policy defines a priority order of different traffic flows of the user plane traffic above the base bitrate, and
wherein the one or more criteria are selected from the group consisting of:

a radio interface resource utilization of the radio access network node,
a transmit power utilization of the radio access network node,
a number of users meeting one or more selection criteria,
a number of packet losses at the radio access network node,
an amount of dropped user plane traffic,
a delay of user plane traffic through the radio access network node,
a throughput of user plane traffic through the radio access network node,
scheduled Internet Protocol throughput for Minimization of Drive Tests with respect to the radio access network node,
a minimal target for resource allocation by the radio access network node,
a lowest weight of a queue as selected for serving by a weight-based scheduler of the radio access network node, and
a lowest classification value of a data packet served by the radio access network node; and
send, to the at least one radio access network node, an indication of the one or more criteria.

14. The network node of claim 13, wherein the instructions are such that the network node is operative to:
receive congestion information from the radio access node; and
determine the criteria depending on the received congestion information.

15. The network node of claim 13, wherein the instructions are such that the network node is operative to: send an indication of the congestion handling policy to the at least one radio access network node.

16. The network node of claim 13, wherein the congestion level is at least one of:
defined on a per bearer level;
defined on a per cell level;
defined on a cell subregion level;
defined on a per user level;
defined on a per traffic type level;
defined to depend on a radio channel quality experienced by a user equipment;
defined to depend on a radio channel quality expected to be achievable for a user equipment.

17. The network node of claim 13, wherein the indication defines a plurality of the criteria and one or more logical operators relating the plurality of the criteria.

18. A computer program product stored in a non-transitory computer readable medium for congestion handling in a cellular network, the computer program product comprising software instructions which, when run on at least one processor of a radio access network node for a cellular network, causes the radio access network node to:
receive an indication of one or more criteria defining one or more congestion levels, and, for each of the one or more congestion levels, an indication of a congestion handling policy associated with this congestion level;
determine whether one of the one or more congestion levels is reached based on the one or more criteria; and
apply, in response to determining that one of the one or more congestion levels is reached, the congestion handling policy associated with the corresponding congestion level, wherein the congestion handling policy defines a base bitrate, and the radio access network node applies the congestion handling policy by assigning a lower priority to user plane traffic above the base bitrate than user plane traffic up to the base bitrate,
wherein the congestion handling policy is further applied by one of (a) applying a modified mapping of weights to bitrates to perform resource allocation and transmitting of a traffic using resources allocated by a scheduler, and (b) by applying an Active Queue Management (AQM) mechanism with no active dropping of data packets at any queue length,
wherein the congestion handling policy defines a priority order of different traffic flows of the user plane traffic above the base bitrate.

19. A computer program product stored in a non-transitory computer readable medium for managing congestion handling in a cellular network, the computer program product comprising software instructions which, when run on at least one processor of a network node of a cellular network, causes the network node to:
determine one or more criteria defining one or more congestion levels to be detected by at least one radio access network node of the cellular network,
wherein the network node determines, for at least one of the one or more congestion levels, a congestion handling policy associated with the congestion level and to be applied by the at least one radio access network node in response to determination of the congestion level is reached,
wherein the congestion handling policy defines a base bitrate, and the congestion handling policy is to be applied by assigning user plane traffic above the base bitrate a lower priority than user plane traffic up to the base bitrate,
wherein the congestion handling policy defines a priority order of different traffic flows of the user plane traffic above the base bitrate, and
wherein the one or more criteria are selected from the group consisting of:
a radio interface resource utilization of the radio access network node,
a transmit power utilization of the radio access network node,
a number of users meeting one or more selection criteria,
a number of packet losses at the radio access network node,
an amount of dropped user plane traffic,
a delay of user plane traffic through the radio access network node,
a throughput of user plane traffic through the radio access network node,
scheduled Internet Protocol throughput for Minimization of Drive Tests with respect to the radio access network node,
a minimal target for resource allocation by the radio access network node,
a lowest weight of a queue as selected for serving by a weight-based scheduler of the radio access network node, and
a lowest classification value of a data packet served by the radio access network node; and
send an indication of the one or more criteria to the at least one radio access network node.

* * * * *